United States Patent
Shortz

(10) Patent No.: US 7,137,109 B2
(45) Date of Patent: Nov. 14, 2006

(54) SYSTEM AND METHOD FOR MANAGING ACCESS TO A CONTROLLED SPACE IN A SIMULATOR ENVIRONMENT

(75) Inventor: Richard Shortz, Keller, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 759 days.

(21) Appl. No.: 10/321,340

(22) Filed: Dec. 17, 2002

(65) Prior Publication Data

US 2004/0117171 A1  Jun. 17, 2004

(51) Int. Cl.
  G06F 9/45    (2006.01)
  G06F 12/00   (2006.01)
  G06F 15/00   (2006.01)
(52) U.S. Cl. .............. 717/149; 711/100; 712/203; 712/206; 712/215
(58) Field of Classification Search .............. None
  See application file for complete search history.

(56) References Cited

U.S. PATENT DOCUMENTS

| | | | |
|---|---|---|---|
| 5,329,471 A * | 7/1994 | Swoboda et al. | 703/23 |
| 5,535,331 A * | 7/1996 | Swoboda et al. | 714/45 |
| 5,551,033 A * | 8/1996 | Foster et al. | 713/100 |
| 5,671,352 A | 9/1997 | Subrahmaniam et al. | |
| 5,805,792 A * | 9/1998 | Swoboda et al. | 714/28 |
| 5,832,418 A * | 11/1998 | Meyer | 702/119 |
| 5,953,529 A * | 9/1999 | Kato | 717/135 |
| 6,032,268 A * | 2/2000 | Swoboda et al. | 714/30 |
| 6,298,320 B1 | 10/2001 | Buckmaster et al. | |
| 6,336,212 B1 * | 1/2002 | Gray et al. | 717/124 |
| 6,715,085 B1 * | 3/2004 | Foster et al. | 726/27 |
| 6,983,374 B1 * | 1/2006 | Hashimoto et al. | 713/194 |

OTHER PUBLICATIONS

TITLE: Multiprocessing, from Wikipedia, the free encyclopedia, source: http://en.wikipedia.org/wik/Multiprocessor, date: 2001.*

* cited by examiner

Primary Examiner—Antony Nguyen-Ba

(57) ABSTRACT

In one embodiment, the invention may comprise a computer-implemented system for managing access to a controlled space in a simulator environment, comprising: means for requiring initialization of a simulated hardware control object by a user code application operable to run on a simulated target platform in the simulator environment, wherein the simulated hardware control object is associated with at least a partition of the controlled space that is simulated by an architectural simulator in the simulator environment; and means for verifying if the simulated hardware control object associated with the partition has been initialized by the user code application when the user code application issues a transaction that attempts to access the partition.

25 Claims, 4 Drawing Sheets

SYSTEM AND METHOD FOR MANAGING ACCESS TO A CONTROLLED SPACE IN A SIMULATOR ENVIRONMENT

BACKGROUND

Architecting reliable software for high performance computing platforms has become a daunting task. In today's multiprocessor (MP) systems having a large number of processors in various architectural arrangements, the task is even more challenging. Because the teachings of the present invention will be exemplified in particular reference to MP platforms, a brief introduction thereto is set forth below.

In the most general sense, multiprocessing may be defined as the use of multiple processors to perform computing tasks. The term could apply to a set of networked computers in different locations, or to a single system containing several processors. As is well known, however, the term is most often used to describe an architecture where two or more linked processors are contained in a single or partitioned enclosure. Further, multiprocessing does not occur just because multiple processors are present. For example, having a stack of personal computers in a rack is not multiprocessing. Similarly, a server with one or more "standby" processors is not multiprocessing, either. The term "multiprocessing" is typically applied, therefore, only to architectures where two or more processors are designed to work in a cooperative fashion on a task or set of tasks.

There exist numerous variations on the basic theme of multiprocessing. In general, these variations relate to how independently the processors operate and how the workload among these processors is distributed. In loosely-coupled multiprocessing architectures, the processors perform related tasks but they do so as if they were standalone processors. Each processor is typically provided with its own private memory and may have its own mass storage and input/output (I/O). Further, each loosely-coupled processor runs its own copy of an operating system (OS), and communicates with the other processor or processors through a message-passing scheme, much like devices communicating over a local area network. Loosely-coupled multiprocessing has been widely used in mainframes and minicomputers, but the software to do so is closely tied to the hardware design. For this reason, among others, it has not gained the support of software vendors and is not widely used in today's high performance server systems.

In tightly-coupled multiprocessing, on the other hand, operation of the processors is more closely integrated. They typically share main memory, and may even have a shared cache. The processors need not be identical to one another, and may or may not perform similar tasks. However, they typically share other system resources such as mass storage and I/O. Additionally, instead of a separate copy of the OS for each processor, they run a single copy, with the OS handling the coordination of tasks between the processors. The sharing of system resources makes tightly-coupled multiprocessing platforms somewhat less expensive, and it is the dominant multiprocessor architecture in the business-class servers currently deployed.

Hardware architectures for tightly-coupled MP platforms can be further divided into two broad categories. In symmetrical MP (SMP) systems, system resources such as memory, disk storage and I/O are shared by all the microprocessors in the system. The workload is distributed evenly to available processors so that one does not sit idle while another is heavily loaded with a specific task. Further, the SMP architecture is highly scalable, i.e., the performance of SMP systems increases, at least theoretically, as more processor units are added.

In asymmetrical MP systems, tasks and resources are managed by different processor units. For example, one processor unit may handle I/O and another may handle network OS (NOS)-related tasks. Thus, it should be apparent that an asymmetrical MP system may not balance the workload and, accordingly, it is possible that a processor unit handling one task can be overworked while another unit sits idle.

SMP systems are further subdivided into two types, depending on the way cache memory is implemented. "Shared-cache" platforms, where off-chip (i.e., Level 2, or L2) cache is shared among the processors, offer lower performance in general. In "dedicated-cache" systems, every processor unit is provided with a dedicated L2 cache, in addition to its on-chip (Level 1, or L1) cache memory. The dedicated L2 cache arrangement accelerates processor-memory interactions in the multiprocessing environment and, moreover, facilitates higher scalability.

As alluded to at the beginning, designing software intended for reliable cross-platform execution on numerous MP systems available nowadays has become an arduous undertaking. Further, with ever-shrinking design/debug cycle times, software developers are continuously looking for ways to streamline the debug operations necessary to architect well-tested code, be it application software, OS software, or firmware (collectively, "applications").

One of the difficulties that can arise in situations where access to a computer system's controlled space is managed by means of hardware control objects such as control status registers, is when the contents of such control objects remain in an indeterminate or undefined state upon returning from a reset. Thus, when a software application attempts to access a controlled space partition in a computer system that is managed by a control object having indeterminate values, a machine fault may result. Since such anomalies are dependent upon the state of the control objects, the condition that some of the software code responsible for issuing transactions that access indeterminate control objects may give rise to potential instabilities in a hardware platform can remain latent until something serious happens. In addition, the problem can be compounded by the fact that oftentimes the hardware development of a particular platform may not have advanced far enough to allow complete testing of the software code targeted for that platform.

SUMMARY

A computer-implemented system for managing access to a controlled space in a simulator environment, comprising: means for requiring initialization of a simulated hardware control object by a user code application operable to run on a simulated target platform in the simulator environment, wherein the simulated hardware control object is associated with at least a partition of the controlled space that is simulated by an architectural simulator in the simulator environment; and means for verifying if the simulated hardware control object associated with the partition has been initialized by the user code application when the user code application issues a transaction that attempts to access the partition.

In another embodiment, the invention may comprise a method of managing access to a controlled space in a simulator environment. The method comprises: when a transaction is issued by a user code application running on a target platform in the simulator environment, wherein the transaction attempts to access a partition of the controlled space, determining if a control status register associated with the partition has been initialized by the user code application; if so, allowing access to the partition by the user code application; and otherwise, initiating a response action in response to determining that the control status register is uninitialized.

In another embodiment, the invention may comprise an architectural simulator for managing access to a controlled space in a simulator environment. The architectural simulator, operating as code executed on a host machine, comprises: instructions operating to require initialization of a control status register by a user code application running on a target platform that is simulated by the architectural simulator, wherein the control status register is associated with at least a partition of the controlled space; instructions for verifying if the control status register associated with the partition has been initialized when the user code application attempts to access the partition; and instructions for initiating an action in response to determining that the control status register is uninitialized.

In another embodiment, the invention may comprise a computer system, comprising: an Operating System (OS) operable to support a architectural simulator for simulating a target platform having at least one processor; instructions associated with the architectural simulator operating to require initialization of a control status register by a user code application running on the target platform, wherein the control status register is associated with at least a partition of the controlled space; instructions for verifying if the control status register associated with the partition has been initialized when the user code application attempts to access the partition; and instructions for initiating an action in response to determining that the control status register is uninitialized.

In another embodiment, the invention may comprise a computer-readable medium operable with a computer system, the computer-readable medium having stored thereon instructions operable with an architectural simulator environment supported by the computer system, the medium comprising: instructions operating to require initialization of a control status register by a user code application running on a target platform in the architectural simulator environment, wherein the control status register is associated with at least a partition of the controlled space; and instructions for verifying if the control status register associated with the partition is initialized when the user code application attempts to access the partition.

DETAILED DESCRIPTION OF THE DRAWINGS

Figure 1A:
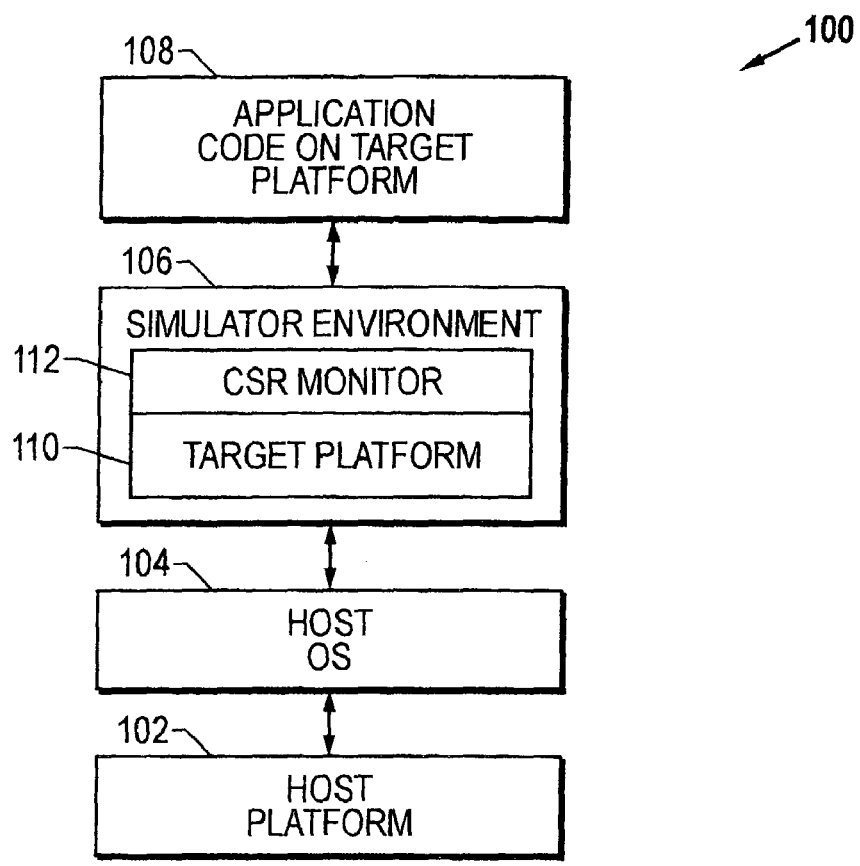
FIG. 1A depicts a functional block diagram of a system for managing access by a user code application to a controlled space in accordance with an embodiment of the present invention.

In the drawings, like or similar elements are designated with identical reference numerals throughout the several views thereof, and the various elements depicted are not necessarily drawn to scale. Referring now to FIG. 1, depicted therein is a functional block diagram of a system 100 for managing access by a user code application to a controlled space in accordance with an embodiment of the present invention. System 100 is operable to support a simulator environment 106 wherein accesses to a controlled space, e.g., system memory, are generally controlled by simulated hardware control objects such as control status registers (CSRs). Included in system 100 is a host machine platform 102 that may be organized using any known computer architecture wherein a host OS 104 executing thereon is operable to provide a software platform. Simulator environment 106 is provided as a software rendition capable of running on the host OS, and may be embodied as an architectural simulator that can simulate a target computer platform 110.

Depending on design objectives, the target platform 110 may comprise a single processor, dual processor, or multi-processor system. Further, as a multiprocessor (MP) system, the target platform 110 may include any MP architecture, e.g., selected from the group consisting of a symmetrical multiprocessor system, an asymmetrical multiprocessor system, a loosely-coupled multiprocessor system and a tightly-coupled multiprocessor system. Also, the multiple processors may be organized into a multicellular system, each cell comprising two or more processors. User application code 108 intended for execution, optimization, and maintenance on the target platform 110 is provided as a software code portion running in the simulator environment 106. Various hardware functionality blocks of the target platform provided for managing access to controlled spaces (i.e., CSRs) are also simulated as part of the software rendition of the target system. Additional details regarding an example of a simulated hardware control object system, wherein a plurality of cell map registers (CMRs) effectuate a mapping between processor cells and memory partitions, are described hereinbelow with reference to FIG. 2.

Figure 1B:
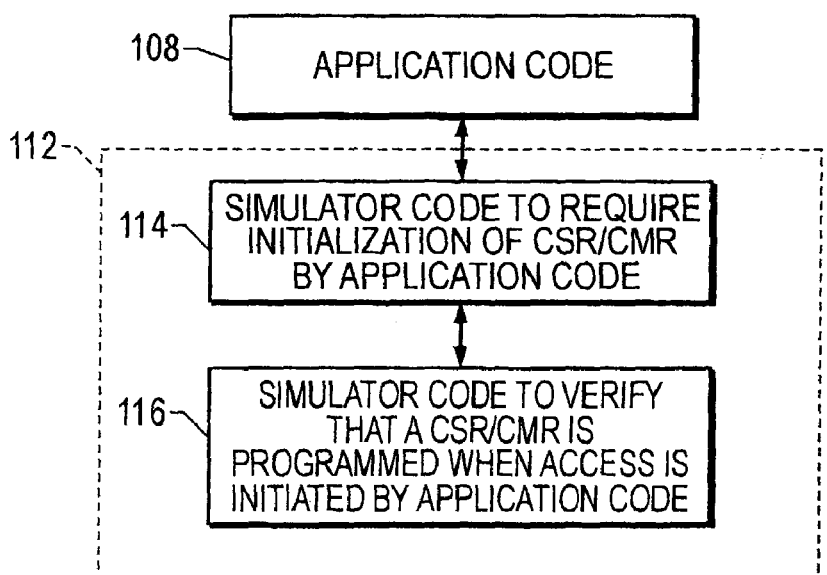
FIG. 1B depicts an embodiment of a simulator monitor for preventing code from accessing a controlled space managed by an uninitialized simulated hardware control object (i.e. having an indeterminate value)

Continuing to refer to FIG. 1A, a CSR monitor 112 is provided as part of simulator code in the simulator environment for preventing user code application 108 from accessing system spaces that are managed by uninitialized hardware control objects. FIG. 1B depicts an embodiment of a simulator-based CSR monitor 112 for managing access to controlled spaces. A simulator code portion 114 is provided which comprises instructions operating to require initialization of a hardware control object (i.e., CSR or CMR) by the user code application prior to accessing a controlled space pursuant to a transaction initiated by the application. In one implementation, the application code may be required to initialize the CSR/CMR by programming it with any value regardless of its validity. In another implementation, the CSR/CMR may be programmed with a predetermined valid value associated with a particular partition of the controlled space. Further, another simulator code portion 116 is also provided which comprises instructions operating to verify if the applicable CSR or CMR has been initialized prior to allowing access when the user code application 108 attempts an access transaction with respect to a particular controlled space partition.

Figure 2:
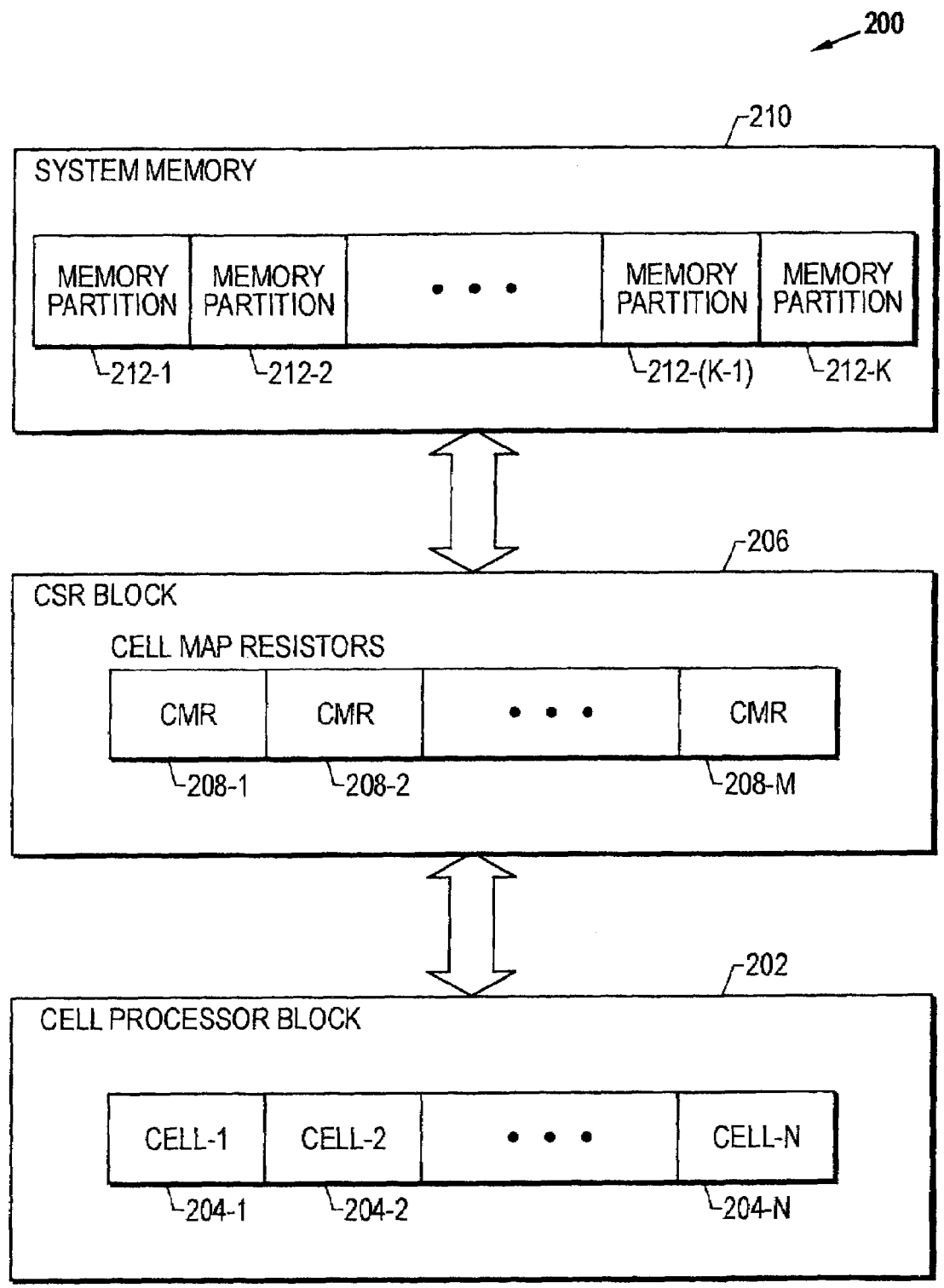
FIG. 2 depicts a high-level functional block diagram of a simulated target platform embodiment wherein a plurality of cell map registers are provided for managing access to a controlled memory space.

Referring now to FIG. 2, depicted therein is a high-level functional block diagram of a simulated target platform embodiment 200 wherein a plurality of cell map registers are provided as part of a simulated CSR block 206 for managing access to a controlled space. The target platform embodiment 200 comprises a multicellular system wherein a cell processor block 202 includes a plurality of cells 204-1 through 204-N, each of which including two or more simulated processors. A system memory block 210 of the target platform embodiment 200 is provided as a controlled space distributed among the cells wherein a plurality of memory partitions 212-1 through 212-K may be accessed by the cells (for example, user code threads running on them) in a predetermined manner. As pointed out earlier, simulated hardware control objects may be provided as a CSR block 206, wherein a plurality of CMRs 208-1 through 208-M describe a correspondence map between the memory and cell partitions (i.e., which memory partition may be accessed by which cellular partition). It should be apparent that where the processors are not grouped into cellular partitions, the correspondence map simply comprises access relationships between the simulated processors (or, the threads executing on them) and the controlled space (i.e., memory partitions).

Figure 3:
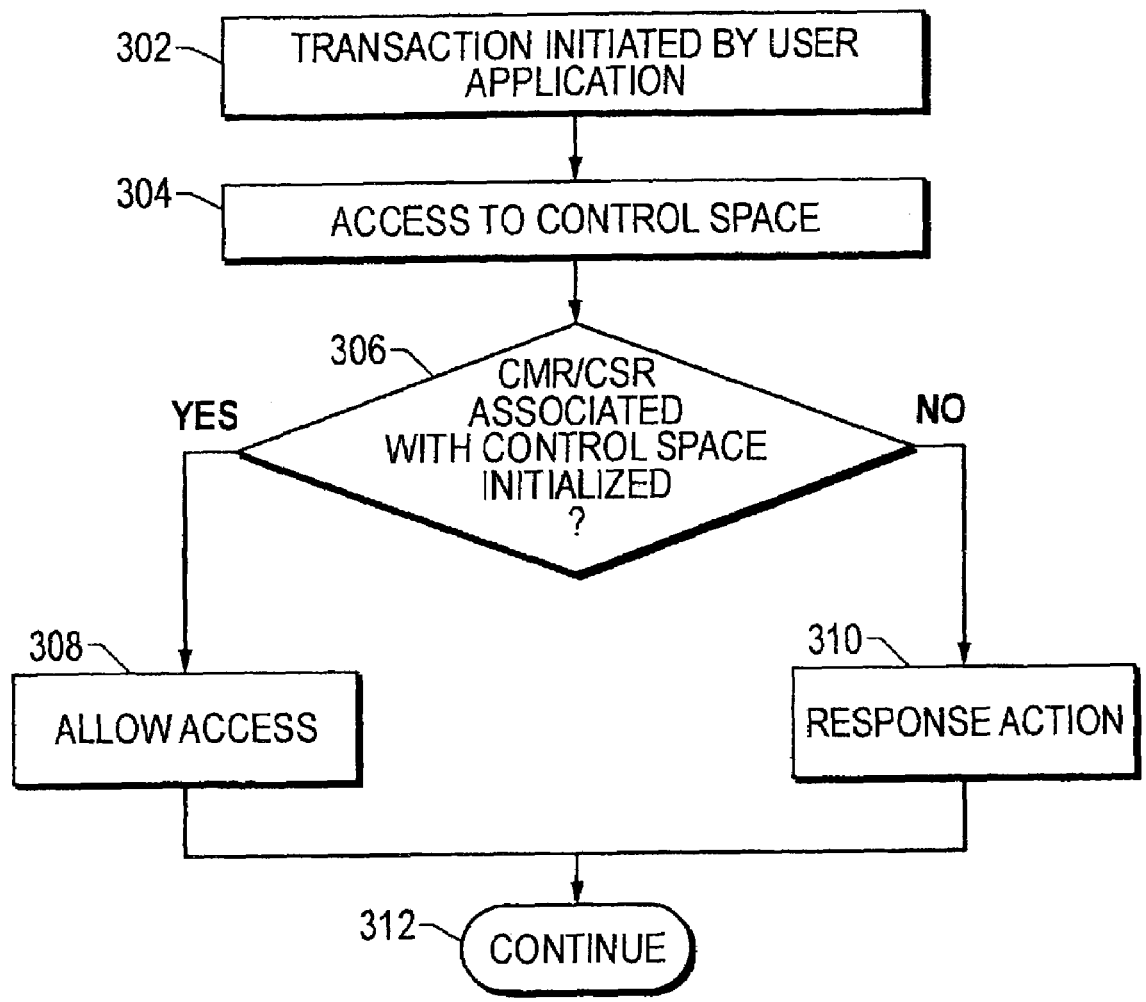
FIG. 3 is a flow chart of the various operations illustrating an embodiment of a method of the present invention for managing access by a user code application to a controlled space.

FIG. 3 is a flow chart of the various operations illustrating an embodiment of one method of the present invention for managing access by a user code application to a controlled space. As part of executing a user code thread on a simulated processor or cell, certain user code instructions may involve transactions requiring access to a controlled space partition corresponding to the processor or cell. Accordingly, when such an access transaction is issued by the user code thread running on a simulated processor or cell (block 302), a simulator-code-based access control mechanism is first invoked (block 304). A determination is made whether a CSR/CMR associated with the applicable controlled space partition has been initialized by the code prior to granting access (decision block 306). If so, access to the partition by the user code thread is allowed (block 308). On the other, if the applicable CSR or CMR is found to be uninitialized, an appropriate response action may be generated (block 310). For instance, a notice of error may be issued to the simulator. Further, a variety of error response mechanisms may be implemented such as, e.g., (i) reporting the error to the user; (ii) terminating the user application that initiated access to a controlled space via an uninitialized CSR/CMR hardware entity; (iii) terminating the simulator; and (iv) providing an alert and continuing to execute the user application.

Figure 4:
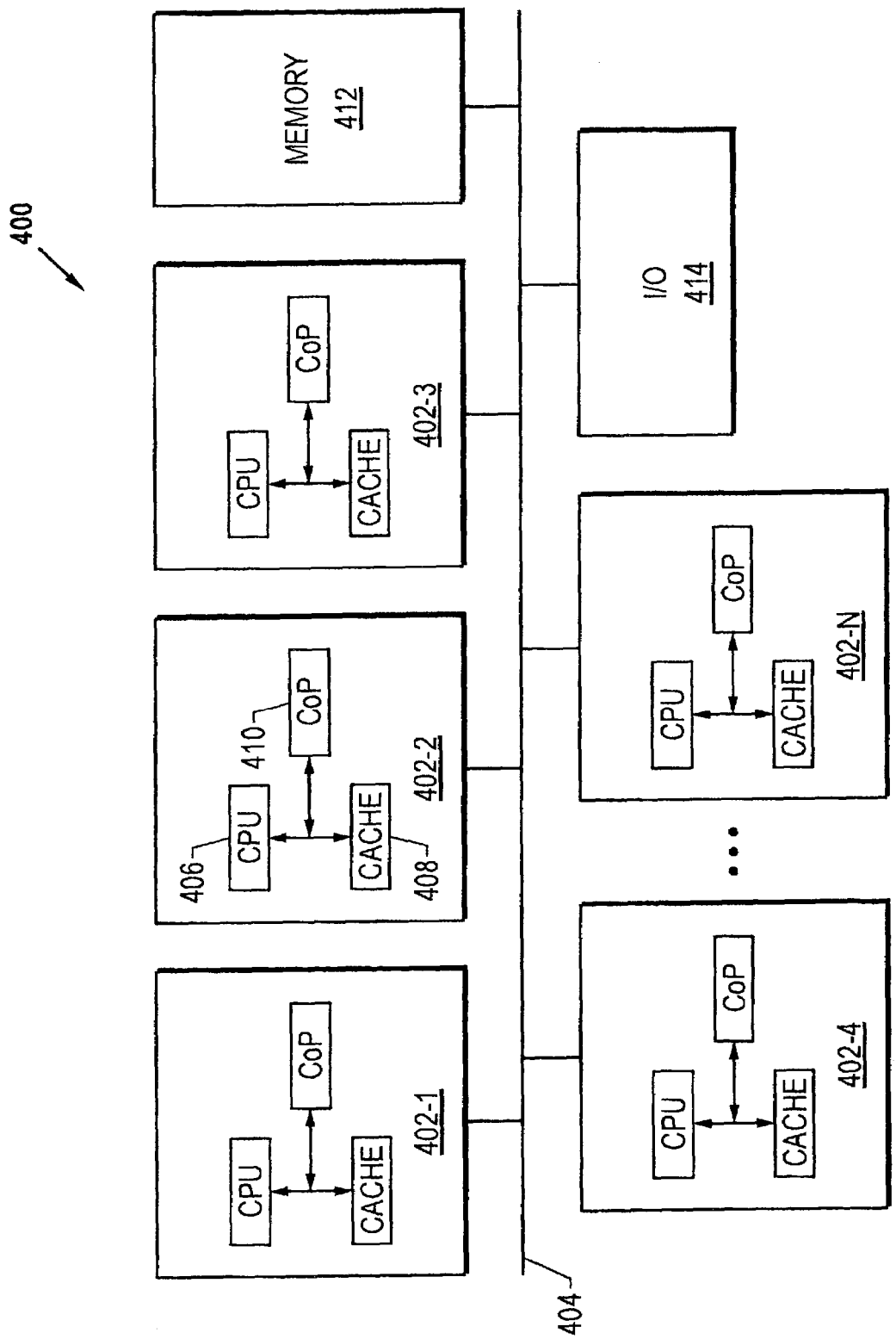
FIG. 4 depicts a block diagram of an embodiment of a target MP system simulated in an architectural simulator.

FIG. 4 depicts a block diagram of an embodiment of a target MP system 400 simulated in an architectural simulator wherein the teachings of the present invention may be advantageously practiced. Reference numerals 402-1 through 402-N refer to a plurality of processor complexes interconnected together via a high performance, MP-capable bus 404. Each processor complex, e.g., processor complex 402-2, is comprised of at least one central processing unit (CPU) 406, a cache memory 408, and one or more coprocessors 410. In one implementation, the MP system is architectured as a tightly coupled SMP system where all processors have uniform access to a main memory 412 and any input/output (I/O) device 414 in a shared fashion. As an SMP platform, each processor has equal capability to enable any kernel task to execute on any processor in the system. Whereas threads may be scheduled in parallel fashion to run on more than one processor complex, a single kernel controls all hardware and software in an exemplary implementation of the MP system 400, wherein locking and synchronization strategies provide the kernel the means of controlling MP events.

Each processor complex may be provided with its own data structures, including run queues, counters, time-of-day information, notion of current process(es) and priority. Global data structures available for the entire MP system 400 are protected by means such as semaphores and spinlocks. Furthermore, in other implementations of the MP system, the processors may be arranged as "cells" wherein each cell is comprised of a select number of processors (e.g., four, six, or eight processors), interrupts, registers and other resources.

The architectural simulator program operable to simulate a hardware platform such as the MP system 400 may be provided with appropriate instructions to carry out the "access control" system and method described in greater detail hereinabove. Any software application intended for execution on the MP system may, accordingly, be debugged, tested, and optimized on the architectural simulator even before the target hardware platform is completely assembled and verified.

Based on the foregoing, those skilled in the art should appreciate that the disclosed architectural simulator system may be used to detect accesses to controlled spaces managed by uninitialized hardware control objects, whereby appropriate responses may be generated for the benefit of users and software developers. Based on the responses generated, accordingly, bugs in an application that cause such access transactions can be fixed early in the code development cycle before a target platform and associated application software are committed to production, where the ability to discover such bugs is substantially reduced while the potential for hardware machine faults remains high.

Although embodiments of the invention have been particularly described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. A computer-implemented system for managing access to a controlled space in a simulator environment, said system is operated with a computer-readable media, comprising:
    means for requiring initialization of a simulated hardware control object by a user code application operable to run on a simulated target platform in said simulator environment, wherein said simulated hardware control object is associated with at least a partition of said controlled space that is simulated by an architectural simulator in said simulator environment; and
    means for verifying if said simulated hardware control object associated with said partition has been initialized by said user code application when said user code application issues a transaction that attempts to access said partition.

2. The system for managing access to a controlled space in a simulator environment as recited in claim 1, wherein said means for requiring initialization of said simulated hardware control object comprises simulator code executing on a host hardware machine as part of said architectural simulator.

3. The system for managing access to a controlled space in a simulator environment as recited in claim 1, wherein said means for verifying if said simulated hardware control object has been initialized comprises simulator code executing on a host hardware machine as part of said architectural simulator.

4. The system for managing access to a controlled space in a simulator environment as recited in claim 1, wherein said simulated hardware control object comprises a cell map register operable to effectuate a correspondence map between a processor and said controlled space.

5. The system for managing access to a controlled space in a simulator environment as recited in claim 1, wherein said simulated target platform comprises one of a symmetrical multiprocessor system, an asymmetrical multiprocessor system, a loosely-coupled multiprocessor system and a tightly-coupled multiprocessor system.

6. The system for managing access to a controlled space in a simulator environment as recited in claim 1, wherein said partition of said controlled space comprises a simulated memory block.

7. The system for managing access to a controlled space in a simulator environment as recited in claim 1, wherein said simulated hardware control object is initialized with a predetermined value.

8. The system for managing access to a controlled space in a simulator environment as recited in claim 1, wherein said simulated hardware control object is programmed with any value.

9. A method of managing access to a controlled space in a simulator environment, comprising:
when a transaction is issued by a user code application running on a simulated target platform in said simulator environment, wherein said transaction attempts to access a partition of said controlled space that is simulated by an architectural simulator in said simulator environment, determining if a simulated hardware control object associated with said partition has been initialized by said user code application;
if so, allowing access to said partition by said user code application; and
otherwise, initiating a response action in response to determining that said simulated hardware control object is uninitialized.

10. The method of managing access to a controlled space in a simulator environment as recited in claim 9, wherein said response action comprises notifying said user code application that said simulated hardware control object associated with said partition is uninitialized.

11. The method of managing access to a controlled space in a simulator environment as recited in claim 9, wherein said response action comprises terminating said simulator environment.

12. The method of managing access to a controlled space in a simulator environment as recited in claim 9, wherein said response action comprises providing an error warning to a user in said simulator environment.

13. The method of managing access to a controlled space in a simulator environment as recited in claim 9, wherein said simulated target platform comprises a multiprocessor computer system.

14. The method of managing access to a controlled space in a simulator environment as recited in claim 13, wherein said multiprocessor computer system is one of a symmetrical multiprocessor system, an asymmetrical multiprocessor system, a loosely-coupled multiprocessor system and a tightly-coupled multiprocessor system.

15. The method of managing access to a controlled space in a simulator environment as recited in claim 9, wherein said simulated hardware control object is initialized with a predetermined value.

16. The method of managing access to a controlled space in a simulator environment as recited in claim 9, wherein said simulated hardware control object is programmed with any value.

17. The method of managing access to a controlled space in a simulator environment as recited in claim 9, wherein said simulated hardware control object comprises a cell map register operable to effectuate a correspondence map between a processor of said simulated target platform and said controlled space.

18. An architectural simulator for managing access to a controlled space in a simulator environment, said architectural simulator operating as code executed on a host machine, comprising:
instructions operating to require initialization of a simulated hardware control object by a user code application running on a simulated target platform that is simulated by said architectural simulator, wherein said simulated hardware control object is associated with at least a partition of said controlled space;
instructions for verifying if said simulated hardware control object associated with said partition has been initialized when said user code application issues a transaction that attempts to access said partition; and
instructions for initiating an action in response to determining that said simulated hardware control object is uninitialized.

19. The architectural simulator for managing access to a controlled space in a simulator environment as recited in claim 18, wherein said instructions for initiating an action comprise instructions for notifying said user code application that said simulated hardware control object associated with said partition is uninitialized.

20. The architectural simulator for managing access to a controlled space in a simulator environment as recited in claim 18, wherein said instructions for initiating an action comprise instructions for terminating said simulator environment.

21. The architectural simulator for managing access to a controlled space in a simulator environment as recited in claim 18, wherein said instructions for initiating an action comprise instructions for providing an error warning to a user in said simulator environment.

22. The architectural simulator for managing access to a controlled space in a simulator environment as recited in claim 18, wherein said simulated target platform comprises a multiprocessor computer system.

23. The architectural simulator for managing access to a controlled space in a simulator environment as recited in claim 18, wherein said simulated hardware control object comprises a cell map register operable to effectuate a correspondence map between a processor of said simulated target platform and said controlled space.

24. A computer system, comprising:
an architectural simulator for supporting a simulated target platform having at least one processor and a controlled space;
means associated with said architectural simulator for requiring initialization of a simulated hardware control object by a user code application operable to run on said simulated target platform, wherein said simulated hardware control object is associated with at least a partition of said controlled space;

means for verifying if said simulated hardware control object associated with said partition has been initialized when said user code application issues a transaction that attempts to access said partition; and means for initiating an action in response to determining that said simulated hardware control object is uninitialized.

25. A computer-readable medium operable with a computer system, said computer-readable medium having stored thereon instructions operable with an architectural simulator environment supported by said computer system, said medium comprising:

instructions operating to require initialization of a simulated hardware control object by a user code application running on a simulated target platform in said architectural simulator environment, wherein said simulated hardware control object is associated with at least a partition of a controlled space that is supported by said architectural simulator environment; and instructions for verifying if said simulated hardware control object associated with said partition is initialized when said user code application issues a transaction that attempts to access said partition.

* * * * *

UNITED STATES PATENT AND TRADEMARK OFFICE
CERTIFICATE OF CORRECTION

| | | |
|---|---|---|
| PATENT NO. | : 7,137,109 B2 | |
| APPLICATION NO. | : 10/321340 | |
| DATED | : November 14, 2006 | |
| INVENTOR(S) | : Richard Shortz | |

It is certified that error appears in the above-identified patent and that said Letters Patent is hereby corrected as shown below:

On the title page, item (57), under "Abstract", in column 2, lines 1-14, delete "In one embodiment, the invention may comprise a computer-implemented system for managing access to a controlled space in a simulator environment, comprising: means for requiring initialization of a simulated hardware control object by a user code application operable to run on a simulated target platform in the simulator environment, wherein the simulated hardware control object is associated with at least a partition of the controlled space that is simulated by an architectural simulator in the simulator environment; and means for verifying if the simulated hardware control object associated with the partition has been initialized by the user code application when the user code application issues a transaction that attempts to access the partition." and insert -- A computer-implemented system for managing access to a controlled space in a simulator environment, comprising: means for requiring initialization of a simulated hardware control object by a user code application operable to run on a simulated target platform in the simulator environment, wherein the simulated hardware control object is associated with at least a partition of the controlled space that is simulated by an architectural simulator in the simulator environment; and means for verifying if the simulated hardware control object associated with the partition has been initialized by the user code application when the user code application issues a transaction that attempts to access the partition. --, therefor.

UNITED STATES PATENT AND TRADEMARK OFFICE
CERTIFICATE OF CORRECTION

PATENT NO. : 7,137,109 B2
APPLICATION NO. : 10/321340
DATED : November 14, 2006
INVENTOR(S) : Richard Shortz It is certified that error appears in the above-identified patent and that said Letters Patent is hereby corrected as shown below:

In column 2, lines 51-63, delete "A computer-implemented system for managing access to a controlled space in a simulator environment, comprising: means for requiring initialization of a simulated hardware control object by a user code application operable to run on a simulated target platform in the simulator environment, wherein the simulated hardware control object is associated with at least a partition of the controlled space that is simulated by an architectural simulator in the simulator environment; and means for verifying if the simulated hardware control object associated with the partition has been initialized by the user code application when the user code application issues a transaction that attempts to access the partition." and insert -- In one embodiment, the invention may comprise a computer-implemented system for managing access to a controlled space in a simulator environment, comprising: means for requiring initialization of a simulated hardware control object by a user code application operable to run on a simulated target platform in the simulator environment, wherein the simulated hardware control object is associated with at least a partition of the controlled space that is simulated by an architectural simulator in the simulator environment; and means for verifying if the simulated hardware control object associated with the partition has been initialized by the user code application when the user code application issues a transaction that attempts to access the partition. --, therefor.

Signed and Sealed this

Ninth Day of December, 2008

JON W. DUDAS
*Director of the United States Patent and Trademark Office*